No. 862,798.

PATENTED AUG. 6, 1907.

A. BRAGG.
PLEASURE RAILWAY.
APPLICATION FILED OCT. 30, 1906.

Witnesses
G. R. Thomas
F. G. Smith

Inventor
A. Bragg
By Chandler & Chandler
Attorneys

UNITED STATES PATENT OFFICE.

ARTHUR BRAGG, OF BROOKLYN, NEW YORK.

PLEASURE-RAILWAY.

No. 862,798.
Specification of Letters Patent.
Patented Aug. 6, 1907.

Application filed October 30, 1906. Serial No. 341,247.

*To all whom it may concern:*

Be it known that I, ARTHUR BRAGG, a citizen of the United States, residing at Brooklyn, in the county of Kings, State of New York, have invented certain new and useful Improvements in Pleasure-Railways; and I do hereby declare the following to be a full, clear, and exact description of the invention, such as will enable others skilled in the art to which it appertains to make and use the same.
This invention relates to pleasure railways and has for its object to provide a frame which is mounted for rotary movement upon an axle which latter carries wheels which travel upon spaced tracks and the primary object of the invention is to provide means for rotating the frame at the proper speed regardless of the speed of travel of the device.

A further object of the invention is to provide a construction of car for railways of this class which may turn short corners and yet permit proper rotation of the frame work above mentioned.

Broadly speaking the invention resides in the provision of an axle at each end of which is fixedly carried brackets including oppositely extending arms upon which are journaled wheels which travel upon spaced tracks and in mounting upon the axle for rotation thereon, the frame, the said frame being driven by means of suitable gearing from one of the aforesaid wheels and being provided with cars which are suspended therefrom.

Figure 1:
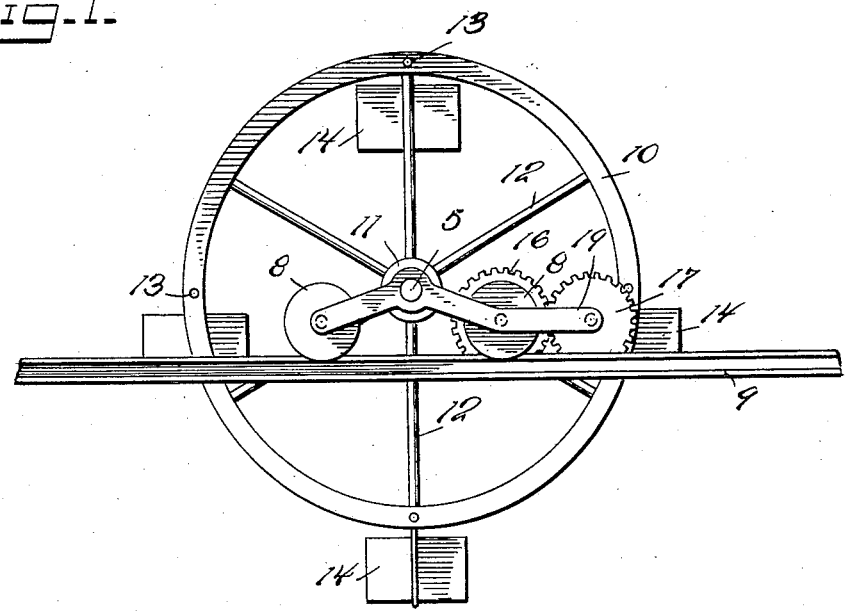
Figure 2:
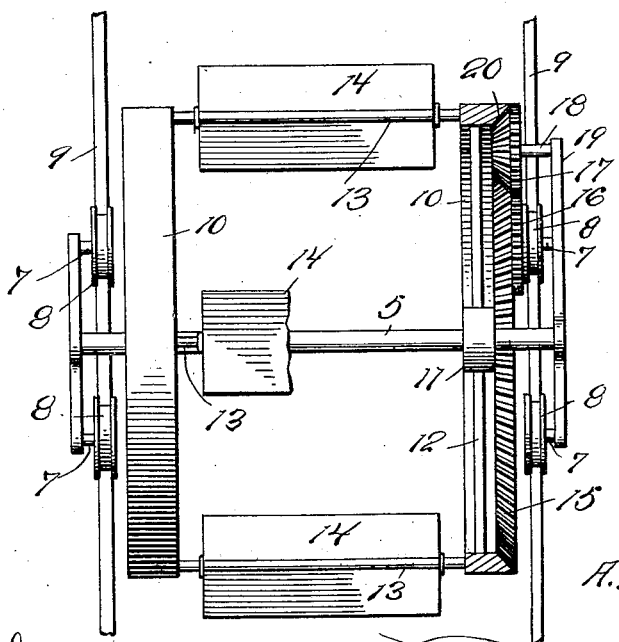

In the accompanying drawings—Figure 1 is a side elevation of the invention. Fig. 2 is a top plan view thereof, one of the spaced annular members of the frame being shown in section to show the gearing for rotating the frame.

Referring more specifically to the drawings the numeral 5 denotes an axle at each end of which is fixedly mounted a bracket including each a pair of oppositely and downwardly extending arms which are provided at their lower ends with inwardly turned stub shafts 7 upon which are journaled peripherally grooved wheels 8 which travel upon tracks 9, it being understood that the tracks are spaced apart a distance equal to the distance between the wheels at each end of the axle. The frame is rotatably mounted upon the axle and the said frame comprises a pair of spaced annular members 10 which are mounted upon the axle by means of hubs 11 and spokes 12 the said members being each substantially in the form of a wheel and the said members are properly spaced from each other and connected together by means of brace rods 13 from which are suspended cars 14. One of the annular members 10 has its inner periphery of beveled gear formation as indicated by the numeral 15 and formed integral with one of the wheels 8 is a pinion 16 which meshes with a pinion 17 journaled upon the inwardly turned end 18 of an arm 19 which is formed integral with the arm 6 upon which the wheel 8 carrying the pinion 16 is located. Formed integral with the pinion 17 is a bevel gear 20 which is in mesh with the beveled geared periphery 15 of the annular member 10 above described.

From the foregoing it will be observed that when traveling upon the inclined track the gearing will be actuated to rotate the frame formed by the annular members 10 and the connecting rods 13 and that the gearing may be so regulated that the frame will be turned gradually and not with sufficient rapidity to throw the cars outwardly therefrom and it will also be observed that by reason of the fact that the wheels 8 upon each side of the frame are only slightly spaced from each other, the short turn may be made by the device whereas if the annular members 10 ran upon the tracks a curve having a considerable radius would be required.

It is to be understood that I do not desire to be limited to the exact details of construction shown and described, for obvious modifications will occur to a person skilled in the art.

What is claimed is:—

A device of the class described comprising an axle, brackets secured to the axle at each of its ends, the axle being non-rotatable, wheels carried by the brackets and arranged to travel upon a section of track, a frame supported upon the axle for rotation thereon, an extension formed integral with one of the brackets, a gear formed upon the track wheel adjacent the extension, a stub shaft carried by the extension, a gear journaled upon the shaft and meshing with the gear upon the track wheel, said last named gear having a bevel gear portion, and a bevel gear formed upon a portion of the frame and meshing with the last named gear.

In testimony whereof, I affix my signature, in presence of two witnesses.

ARTHUR BRAGG.

Witnesses:
ELIZABETH M. BRAGG,
MAY V. BRAGG.